Aug. 23, 1927.
C. R. FOWLER ET AL
1,640,119
ELECTRIC ACCUMULATOR FOR HANDLAMPS
Filed Sept. 25, 1925
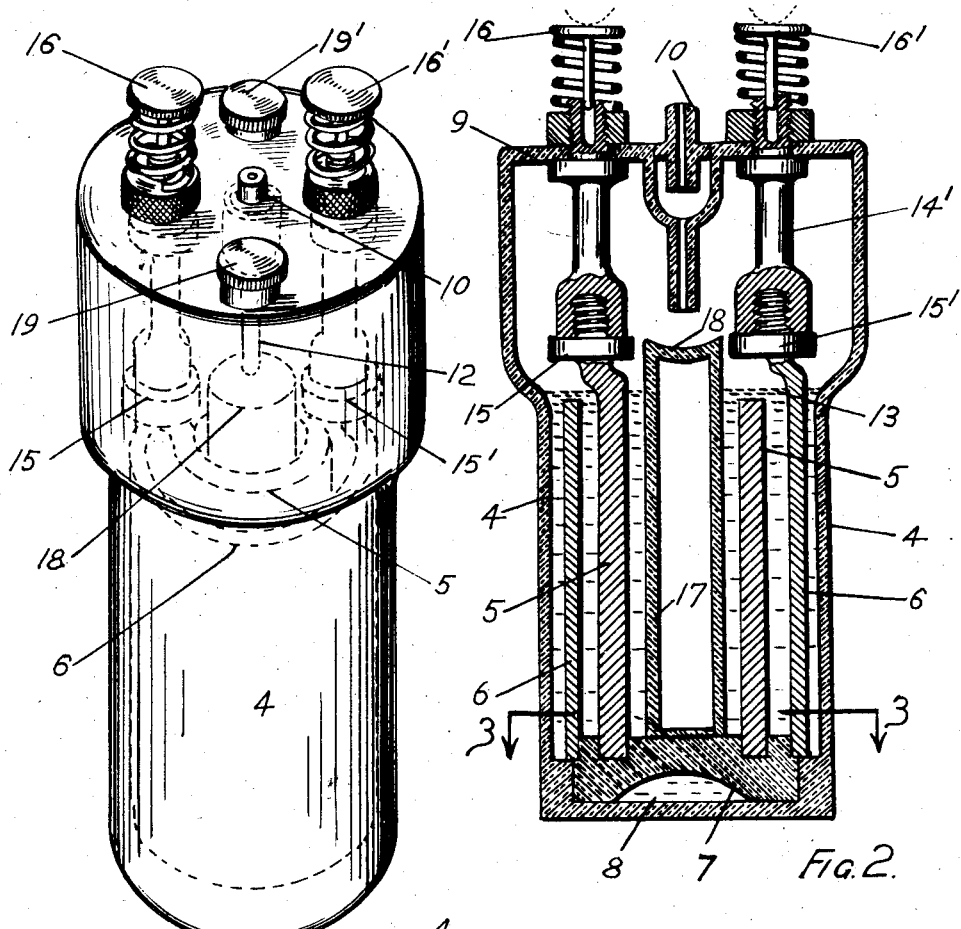

Patented Aug. 23, 1927.

1,640,119

UNITED STATES PATENT OFFICE.

CHARLES RUPERT FOWLER AND EDRIC MILBURN ROBERTS, OF BULLI, NEW SOUTH WALES, AUSTRALIA.

ELECTRIC ACCUMULATOR FOR HANDLAMPS.

Application filed September 25, 1925, Serial No. 58,554, and in Australia April 22, 1925.

This invention relates to accumulators for miners' or other electric hand lamps employing a liquid electrolyte (usually dilute sulphuric acid) or a solidified electrolyte. A difficulty hitherto experienced has been to provide a constant vent for the escape of fumes and at the same time prevent the escape of liquid electrolyte if the lamp or accumulator be shaken, knocked over, permitted to fall or otherwise be more or less so violently handled or so positioned as to splash the electrolyte out from or permit it to flow through the vent. It is found that with a so called solidified electrolyte a separation occurs and a layer of liquid (acid) forms on the top of the remaining more or less solid portion and that this liquid is liable to splash or flow out through the vent.

The present invention is devised with the object of overcoming the difficulty and of providing an accumulator so constructed and vented that while the escape of fumes is unrestricted it is practically impossible to either splash or spill the electrolyte through the vent.

With this object our invention consists in an accumulator comprising a case or container of celluloid or other suitable material for the reception of positive and negative plates and of the electrolyte and provided with venting means comprising a tube passing through the closed top, a cup shaped chamber or receptacle secured to and making a fluid-tight joint with the underside of the container top, and a tube extending downwardly from the lower end of said receptacle to a point above the normal level of the electrolyte, the lower end of the last mentioned tube being protected by a baffle.

Our invention also consists in an accumulator vented as aforesaid in which the container is so formed that the upper portion (i. e. above the normal level of the electrolyte) is of sufficient capacity to receive the whole of the normal quantity of electrolyte should the container be inverted or laid horizontally without submerging the inner end of the vent tube.

The two before mentioned features are interdependent, the position of the inner end of the vent-tube regulating the diametric dimension of the upper part of the container, and vice-versa, the shorter the vent-tube, the greater must be the diameter of the upper part of the container.

An embodiment of the invention is described hereinafter with reference to the accompanying drawings which depict an accumulator including the above mentioned features and other features in which the invention resides as will be ascertained from the description. The drawings depict the invention as applied to an accumulator employing plates of ordinary cylindrical form and length, extension pieces being provided to connect the pole-pieces with the contacts.

In the drawings:

Fig. 1 is an external perspective view of an accumulator according to our invention, with certain internal parts shown in dotted lines;

Fig. 2 is a sectional elevation, and

Fig. 3 a plan view on line 3.3. of Fig. 2.

The casing 4 is, as regards its lower portion, of usual size and shape for the reception of the cylindrical positive and negative plates 5 and 6 respectively which are supported upon a cross-piece 7 fitted loosely in the bottom of the casing, said cross-piece being hollowed out as at 8 on its underside to accommodate sediment.

Centrally in the top 9 of the casing is fitted a short vent tube 10 which at its inner end enters the cup-shaped chamber 11 sealed about its upper edge to the casing-top 9. Connected to the bottom of chamber 11 is a tube 12, the lower end of which is located above the normal level of the electrolyte as indicated by the numeral 13.

The upper portion of the casing 4 above the normal electrolyte level is so formed that its effective capacity is sufficient to contain the whole of the normal quantity of electrolyte without submerging the inner (lower) end of tube 12 should the casing be laid horizontally or be completely inverted. To obtain this result the length of the casing may be increased, but in order not to unduly increase the total length, the preferred construction is (as shown) increased diameter and increased length.

This increased length necessitates the employment (in the construction shown) of extension-pieces 14 and 14' connecting the poles 15 and 15' of the positive and negative plates 5 and 6 respectively with the spring contacts 16 and 16' of known type screwed on to the upper ends of the extension pieces. The upper ends of the extension pieces are formed as screwed spigots which pass through the casing-top 9, while their lower ends are formed as sockets screwed on to the plate pole pieces.

Fixed centrally in the casing 4 and secured to the cross-piece 7 is a sealed tubular filler 17 having a dished top 18. This filler serves to diminish the capacity of the lower part of the casing 4 without involving a consequential diminution of the superficial areas of the plates, and also has another function inasmuch as its dished top serves as a baffle preventing direct upward splash of electrolyte into the tube 12, should the accumulator be violently agitated.

In the top of the casing 4 are two filler plugs 19 and 19' disposed in diametrically opposite arrangement for purposes well known in the art.

What we claim and desire to secure by Letters Patent is:

An electric accumulator which comprises a casing or container holding a body of electrolyte and annular positive and negative plates submerged in said electrolyte and connected respectively to external contacts, venting means comprising a cup shaped chamber making fluid tight contact at its upper edge with the inside of the top of the casing, an outer tube passing through the casing top into said chamber, and an inner tube extending downwardly from the bottom of said chamber, the lower end of said inner tube terminating above the normal level of the electrolyte, a cross piece in the bottom of the casing and on which said plates are arranged and a sealed tubular filler arranged on the center of the cross piece and within the inner annular plate, said filler having a dished top arranged under and spaced from the lower end of the inner tube of said cup so that said filler forms a baffle.

Signed at Sydney, New South Wales, this fifteenth day of August, A. D. 1925.

CHARLES RUPERT FOWLER.
EDRIC MILBURN ROBERTS.